United States Patent
Lan et al.

(10) Patent No.: US 8,249,822 B2
(45) Date of Patent: Aug. 21, 2012

(54) MOTION CONTROLLER HAVING MICRO ELECTRICAL MECHANICAL SYSTEM PRESSURE SENSING MODULE

(75) Inventors: Hai Lan, Taipei Hsien (TW); Ga-Lane Chen, Santa Clara, CA (US); Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/813,100

(22) Filed: Jun. 10, 2010

(65) Prior Publication Data

US 2011/0172949 A1    Jul. 14, 2011

(30) Foreign Application Priority Data

Jan. 14, 2010   (CN) .......................... 2010 1 0300320

(51) Int. Cl.
*G06F 15/00*   (2006.01)

(52) U.S. Cl. .............. 702/138; 702/33; 702/41; 702/45; 702/47; 702/50; 702/139; 702/140

(58) Field of Classification Search .................... 702/33, 702/41, 45, 47, 50, 138–140; 73/862.046
See application file for complete search history.

(56) References Cited

U.S. PATENT DOCUMENTS

2010/0037709 A1*   2/2010   Yeh et al. ................ 73/862.046

\* cited by examiner

*Primary Examiner* — Sujoy Kundu
(74) *Attorney, Agent, or Firm* — Altis Law Group, Inc.

(57) ABSTRACT

A motion controller includes a handle and a MEMS pressure sensing module. The handle has an output interface circuit for coupling with a terminal electronic device. The MEMS pressure sensing module includes a compressible member mounted on the handle, a MEMS sensor for sensing a pressure applied on the compressible member and converting the pressure into electronic signals, a processing unit for calculating a value of the pressure according to the electronic signals, and a power supply unit for supplying power to the processing unit. The processing unit is connected with the output interface circuit such that a user is able to obtain the pressure value from the terminal electronic apparatus.

10 Claims, 5 Drawing Sheets

MOTION CONTROLLER HAVING MICRO ELECTRICAL MECHANICAL SYSTEM PRESSURE SENSING MODULE

BACKGROUND

1. Technical Field

The present disclosure relates to motion controller for electronic game apparatus, and particularly, to a motion controller including a micro electrical mechanical system (MEMS) pressure sensing module.

2. Description of Related Art

Following rapid development of electronic technology, a variety of wireless-control game apparatuses has been disclosed. A typical wireless-control game apparatus includes a host device and a wireless motion controller. The wireless motion controller includes a controller body, a spring accommodated in the controller body and an outer button connecting to the spring. Using a bowling game for instance as an example, when waving the motion controller with pressure being exerted on the button and then stops by releasing the button, a control signal reflecting an exterior force that a player applies is being transmitted into the host device, such as when a ball is rolled to hit a target. The ball usually stops before reaching the target, and the player has to apply a greater amount of force. Unfortunately, the game apparatus is unable to provide the exact value of this applied exterior force. The player has to adjust the exterior force based on instinct. Therefore, a motion controller capable of notifying a more precise exterior force in real-time is desired.

BRIEF DESCRIPTION OF THE DRAWINGS

Many aspects of the present motion controller can be better understood with reference to the following drawings. The components in the drawings are not necessarily drawn to scale, the emphasis instead being placed upon clearly illustrating the principles of the present motion controller. Moreover, in the drawings, like reference numerals designate corresponding parts throughout the several views.

DETAILED DESCRIPTION

Embodiment of the present motion controller having a MEMS pressure sensing module will now be described in detail below and with reference to the drawings. The MEMS pressure sensing module is an integrated micro system including a micro sensor, a processor, a circuit for processing and controlling signals, an interface circuit, a communicator, and a power supply.

Figure 1:
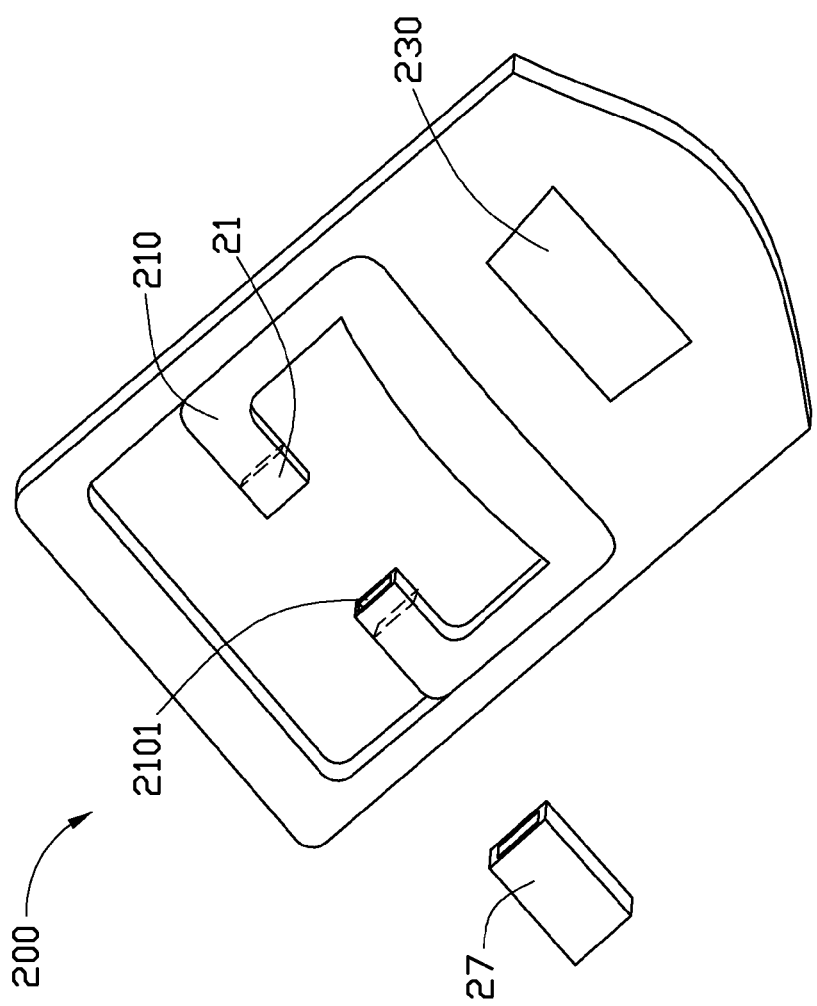
FIG. 1 is an isometric, exploded view of a motion controller in accordance with a first embodiment, in which the motion controller has a MEMS pressure sensing module.
Figure 2:
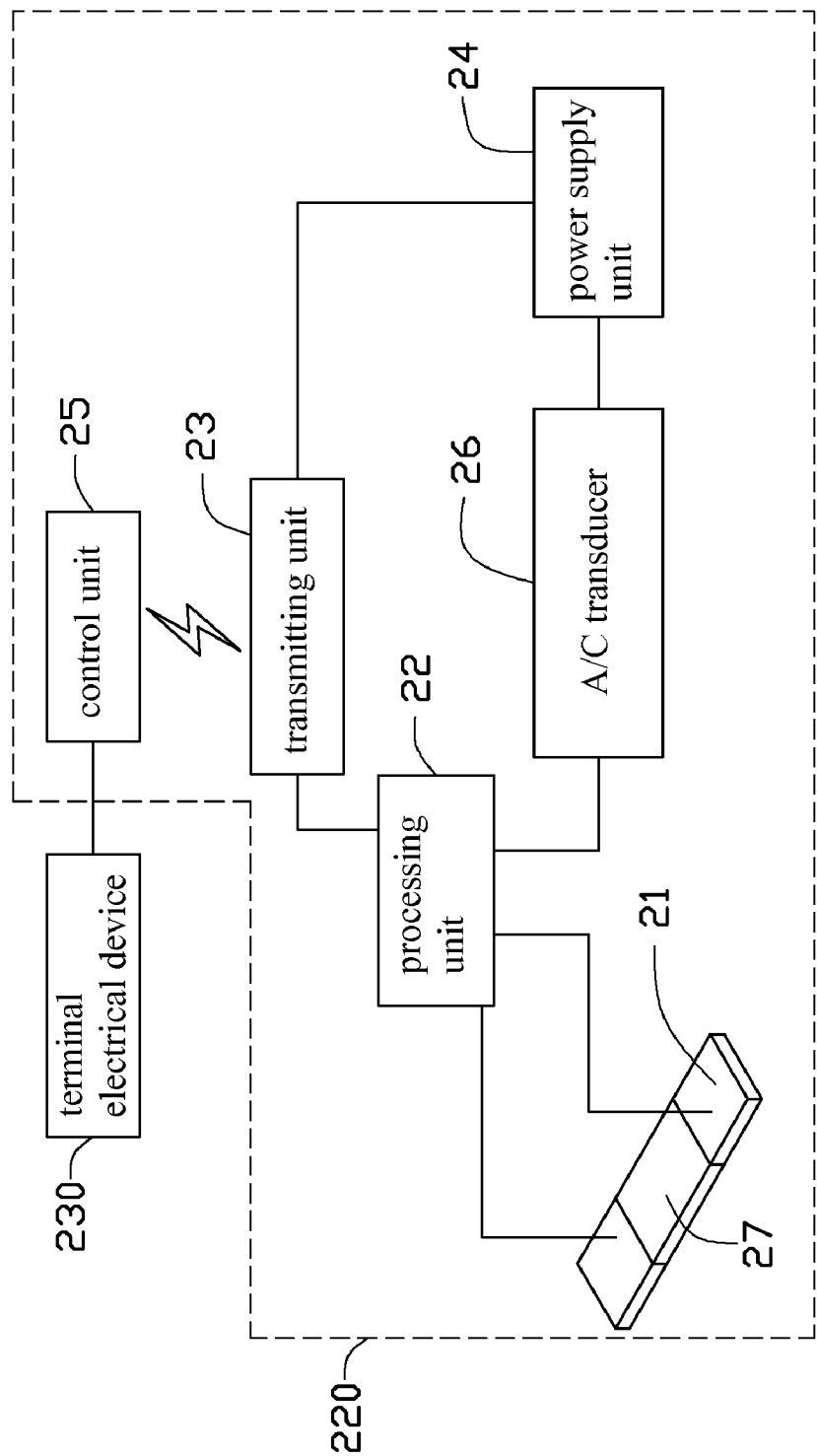
FIG. 2 shows the configuration of the MEMS pressure sensing module of FIG. 1.

Referring to FIGS. 1 and 2, a motion controller 200 includes a hollow handle 210, a MEMS pressure sensing module 220 and a terminal electronic device 230. The handle 210 includes an output interface circuit (not shown) for coupling with the terminal electronic device 230. The output interface circuit is integrated on a printed circuit board (not shown) accommodated in the handle 210. The handle 210 has two openings 2101 which are opposite to one another. The MEMS pressure sensing module 220 includes a MEMS sensor 21, a processing unit 22, a transmitting unit 23, a power supply unit 24, a control unit 25 and an A/C transducer 26, which are all integrated on the printed circuit board. In addition, the MEMS pressure sensing module 220 includes a compressible member 27.

The compressible member 27 is a hollow cubical pipe, two end portions thereof wrap around and are fixed on the two ends of the handle 210. In this manner, the compressible member 27 and the handle 210 are interconnected with each other. The compressible member 27 is capable of deforming under pressure, and recovering to its original shape upon being released. In an alternate embodiment, two end portions of the compressible member 27 are inserted into the openings 2101 of the handle 210.

The MEMS sensors 21 are fittingly accommodated in the handle 210, and adjoin to the respective openings 2101. It is noteworthy that when pressing the compressible member 27, an airflow is resultantly produced and an impulse force equivalent to a pressure applied on the compressible member 27 is exerted on the MEMS sensor 21. The MEMS sensor 21 is capable of sensing the pressure according to the impulse force and converting the pressure into a plurality of digital signals.

The processing unit 22 electrically connects with the MEMS sensor 21, configured for calculating the values of the pressure according to the digital signals from the MEMS sensor 21. The processing unit 22 is a micro control unit. In an alternate embodiment, the processing unit 22 is an application specific integrated circuit.

The transmitting unit 23 couples with the processing unit 22 and the control unit 25, configured for transmitting the values of the pressure from the processing unit 22 to the control unit 25. In the present embodiment, the transmitting unit 23 is a bluetooth.

The power supply unit 24 is configured for supplying power to the transmitting unit 23 and the processing unit 22. The A/C transducer 26 interconnects with the processing unit 22 and the power supply unit 24, configured for converting a voltage of the power supply unit 24 into a suitable one for the processing unit 22.

The control unit 25 is configured for storing the values of the pressure, and controlling an operation of a terminal apparatus 230 through the output interface circuit. In the present embodiment, the terminal apparatus 230 is a display for displaying the values of the pressure, electrically connected with the control unit 25. In an alternate embodiment, the terminal apparatus 230 is an audio device for directly broadcasting values of the pressure.

The MEMS pressure sensing module 220 is relatively small, sensitive, and possesses quick response to any pressure. Therefore, the player can obtain more accurate values of the pressure which they apply in real-time.

The terminal electronic device 230 can be precluded from the present motion controller 200. Under this setup, consumers can select any types of terminal apparatus in person, such as a television, a computer etc, for coupling with the handle 210 having the MEMS pressure sensing module 220 and the output interface circuit. Connection between the terminal electronic device 230 and the control unit 25 can be wireless.

Figure 3:
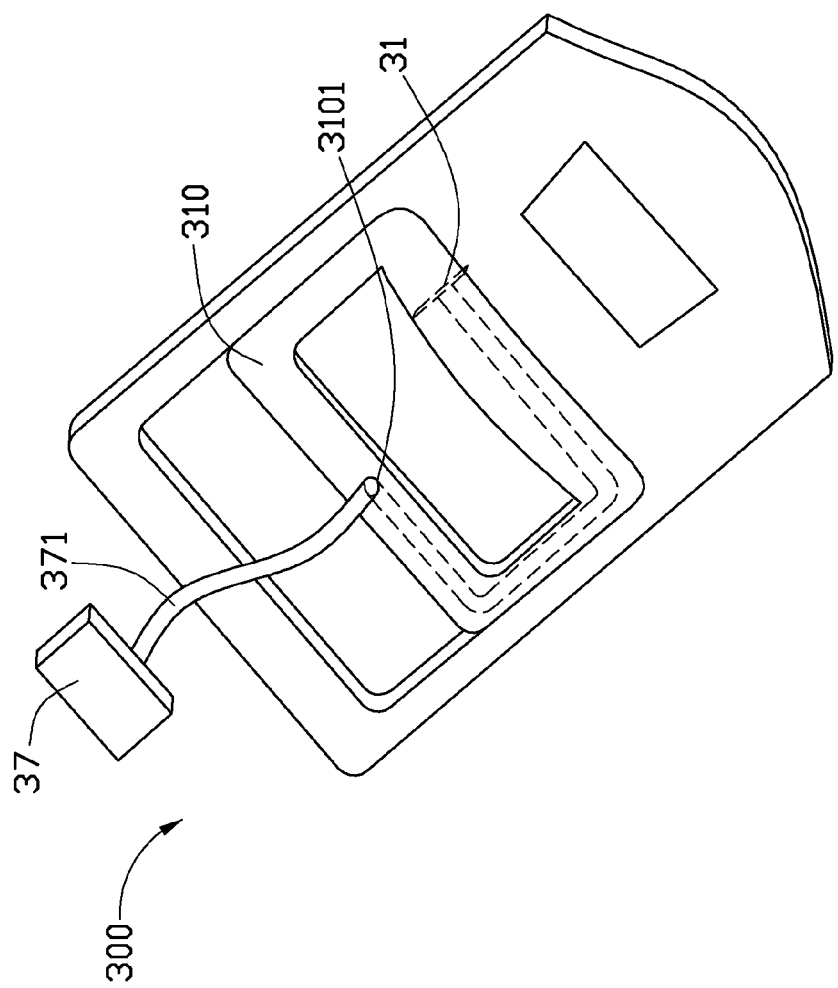
FIG. 3 shows another motion controller in accordance with a second embodiment.

Referring to FIG. 3, another motion controller 300 provided in a second embodiment has similar structure as that of the motion controller 200, and differing in the further inclusion of a gas guide pipe 371. Additionally, the handle 310 has an opening 3101, and single MEMS sensor 31.

One end of the gas guide pipe 371 communicates with the compressible member 37, and another end of the gas guide pipe 371 is accommodated in the handle 310 and sealed with the MEMS sensor 31. The MEMS sensor 31 is disposed away from the opening 3101. As such, the MEMS sensor 31 is protected from being damaged when the handle 310 is grasped.

Figure 4:
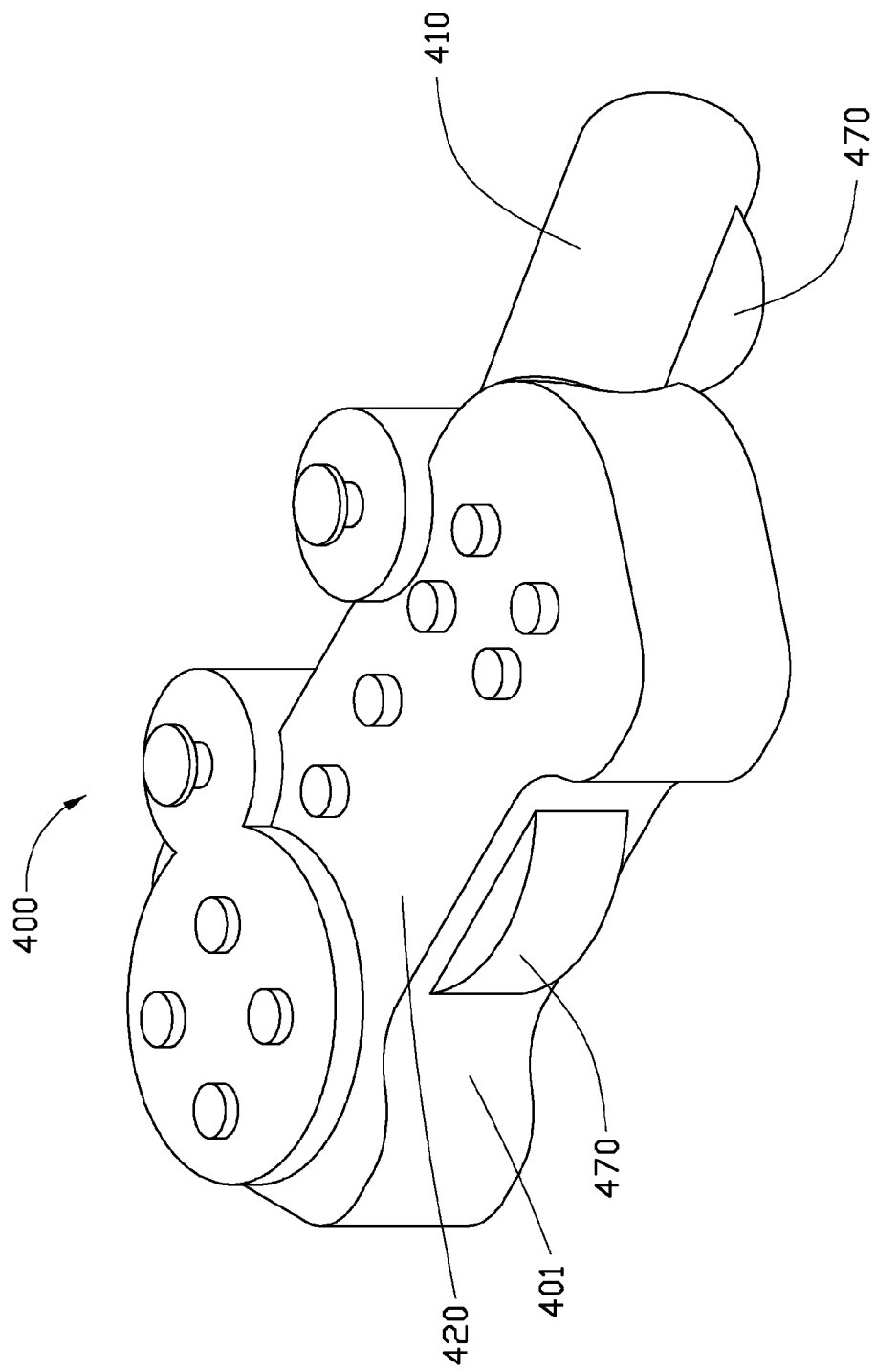
FIG. 4 shows a yet another motion controller in accordance with a third embodiment.

Referring to FIG. 4, a yet another motion controller 400 provided in a third embodiment, includes a first handle 410, a second handle 420 having a plurality of buttons, and a pressure sensing module (not shown). The pressure sensing module includes two MEMS sensors, a processing unit, a transmitting unit, a power supply unit, a control unit and an A/C transducer all accommodated in the second handle 420. The pressure sensing module further has two compressible members 470 mounted on the first handle 410 and the second handle 420, respectively. The two MEMS sensor each seals an opening of the compressible member 470.

Figure 5:
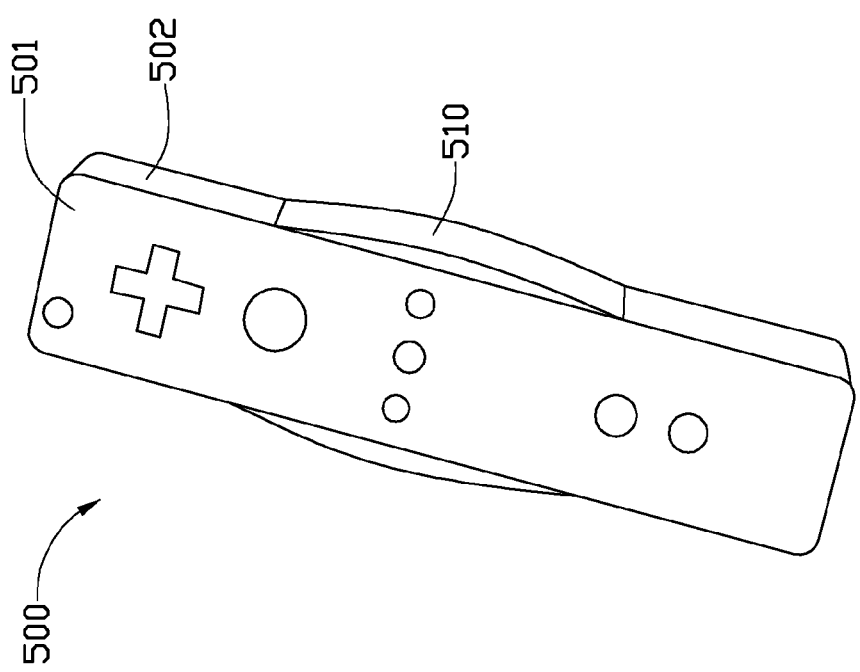
FIG. 5 shows a still another motion controller in accordance with a fourth embodiment.

Referring to FIG. 5, a still another motion controller 500 provided in a fourth embodiment includes a control handle 501 having a plurality of buttons and a pressure sensing module (not shown). The pressure sensing module includes two MEMS sensors, a processing unit, a transmitting unit, a power supply unit, a control unit and an A/C transducer all accommodated in the handle 501. The pressure sensing module further has two compressible members 510 respectively mounted on two opposite sidewalls 502 of the handle 501. The two MEMS sensor each seals an opening of the compressible member 510.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A motion controller, comprising:
    a handle having an output interface circuit for coupling with a terminal electronic device; and
    a MEMS pressure sensing module, comprising:
        a compressible member mounted on the handle the compressible member capable of deforming under a pressure applied thereon, and recovering to its original shape upon being released;
        a MEMS sensor configured for sensing an impulse force of an airflow caused by the deformation of the compressible member and converting the impulse force into a plurality of electronic signals;
        a processing unit for calculating a value of the pressure according to the electronic signals, the processing unit being connected with the output interface circuit such that a user is able to obtain the pressure value from a terminal apparatus; and
        a power supply unit for supplying power to the processing unit.

2. The motion controller of claim 1, wherein the MEMS sensor seals an opening of the handle and adjoins the compressible member.

3. The motion controller of claim 1, further comprising a gas guide pipe, one end of the gas guide pipe communicating with the compressible member, and another end of the gas guide pipe is sealed with the MEMS sensor.

4. The motion controller of claim 1, wherein the MEMS pressure sensing module further comprises a transmitting unit and a control unit electrically connecting with the output interface circuit, the transmitting unit is configured for transmitting the value of the pressure to the control unit, and the control unit is capable of storing the value of the pressure.

5. The motion controller of claim 4, wherein the MEMS pressure sensing module further comprises an A/D transducer interconnecting with the processing unit and the power supply unit.

6. The motion controller of claim 5, wherein the output interface circuit, the MEMS sensor, the processing unit, the power supply unit, the transmitting unit, the control unit and the A/D transducer are integrated on a printed circuit board accommodated in the handle.

7. The motion controller of claim 1, further comprising a terminal electronic device for providing the pressure, and the terminal electronic device coupled with the output interface circuit.

8. The motion controller of claim 7, wherein the terminal electronic device is mounted in and exposed from the handle.

9. The motion controller of claim 7, wherein the terminal electronic device wirelessly connects with the control unit.

10. A motion controller, comprising:
    a handle having an output interface circuit for coupling with a terminal electronic device, the handle being hollow; and
    a MEMS pressure sensing module, comprising:
        a compressible member being hollow and communicating with the handle, the compressible member capable of deforming under a pressure applied thereon, and recovering to its original shape upon being released;
        a MEMS sensor being accommodated in the handle, the MEMS sensor for sensing an impulse force of an airflow caused by the deformation of the compressible member and converting the impulse force into a plurality of electronic signals;
        a gas guide pipe, one end of the gas guide pipe communicating with the compressible member, and another end of the gas guide pipe being sealed with the MEMS sensor, the MEMS sensor being disposed outside and away from the compressible member;
        a processing unit for calculating a value of the pressure according to the electronic signals, the processing unit being connected with the output interface circuit such that a user is able to obtain the pressure value from a terminal apparatus; and
        a power supply unit for supplying power to the processing unit.

* * * * *